(12) United States Patent
Prince et al.

(10) Patent No.: US 9,657,193 B2
(45) Date of Patent: May 23, 2017

(54) COMPOSITION COMPRISING CYCLIC SECONDARY AMINE AND METHODS OF COATING DRINKING WATER PIPELINES

(75) Inventors: Ryan B. Prince, St. Paul, MN (US); Clinton L. Jones, Somerset, WI (US); Stuart E. Fores, Darlington (GB); Alexander J. Kugel, Woodbury, MN (US); Cori S. Apel, Woodbury, MN (US); Mario A. Perez, Burnsville, MN (US); Dana R. Reed, Minneapolis, MN (US)

(73) Assignee: 3M INNOVATIVE PROPERTIES CO., St. Paul, MN (US)

(*) Notice: Subject to any disclaimer, the term of this patent is extended or adjusted under 35 U.S.C. 154(b) by 72 days.

(21) Appl. No.: 14/001,528

(22) PCT Filed: Feb. 21, 2012

(86) PCT No.: PCT/US2012/025917
§ 371 (c)(1),
(2), (4) Date: Aug. 26, 2013

(87) PCT Pub. No.: WO2012/161774
PCT Pub. Date: Nov. 29, 2012

(65) Prior Publication Data
US 2014/0010956 A1    Jan. 9, 2014

Related U.S. Application Data

(60) Provisional application No. 61/469,231, filed on Mar. 30, 2011.

(51) Int. Cl.
| | | |
|---|---|---|
| *C09D 175/02* | (2006.01) | |
| *C09D 175/04* | (2006.01) | |
| *C08K 5/10* | (2006.01) | |
| *C08K 5/105* | (2006.01) | |
| *C08K 5/523* | (2006.01) | |
| *C08K 5/526* | (2006.01) | |
| *F16L 55/164* | (2006.01) | |
| *F16L 55/1645* | (2006.01) | |
| *C08G 18/32* | (2006.01) | |
| *C08G 18/73* | (2006.01) | |
| *C08G 18/75* | (2006.01) | |
| *C08G 18/10* | (2006.01) | |
| *B05D 7/22* | (2006.01) | |

(52) U.S. Cl.
CPC ............ *C09D 175/02* (2013.01); *B05D 7/22* (2013.01); *B05D 7/222* (2013.01); *C08G 18/10* (2013.01); *C08G 18/325* (2013.01); *C08G 18/3234* (2013.01); *B05D 2254/04* (2013.01); *C08G 2390/40* (2013.01)

(58) Field of Classification Search
CPC .. C09D 175/02; C08G 18/10; C08G 18/3234; C08G 18/325; C08G 2390/40; B05D 7/22; B05D 7/222; B05D 2254/04
USPC ........................................................ 427/230
See application file for complete search history.

(56) References Cited

U.S. PATENT DOCUMENTS

| | | |
|---|---|---|
| 3,509,093 A | 4/1970 | Lehmann |
| 4,748,201 A | 5/1988 | Smith |
| 5,173,560 A | 12/1992 | Gras |
| 5,312,042 A | 5/1994 | Larson |
| 5,312,886 A | 5/1994 | House |
| 6,074,702 A | 6/2000 | Robinson |
| 6,107,436 A | 8/2000 | Goeb |
| 6,166,106 A | 12/2000 | Purgett et al. |
| 6,573,398 B2 | 6/2003 | Hansen et al. |
| 6,730,353 B2 | 5/2004 | Robinson |
| 6,833,424 B2 | 12/2004 | Milhem |
| 7,001,948 B2 | 2/2006 | Gupta |
| 7,169,876 B2 | 1/2007 | Asher |
| 7,189,429 B2 | 3/2007 | Robinson |
| 7,338,687 B2 | 3/2008 | Davis |
| 7,342,056 B2 | 3/2008 | Patel et al. |
| RE40,729 E | 6/2009 | Purgett et al. |
| 2002/0045006 A1 | 4/2002 | Robinson |
| 2003/0192638 A1 | 10/2003 | Yang |
| 2004/0175239 A1 | 9/2004 | Pare |
| 2004/0247785 A1 | 12/2004 | Robinson |
| 2004/0258837 A1 | 12/2004 | Robinson |
| 2006/0112996 A1 | 6/2006 | Poole |
| 2006/0122320 A1 | 6/2006 | Cahill |
| 2007/0043197 A1* | 2/2007 | Posey et al. ............... 528/44 |
| 2007/0208157 A1 | 9/2007 | Posey |
| 2008/0008866 A1 | 1/2008 | Smith |
| 2008/0141903 A1 | 6/2008 | Barancyk |
| 2010/0162949 A1 | 7/2010 | Gillanders |
| 2010/0227151 A1 | 9/2010 | Rowlands |
| 2010/0243092 A1 | 9/2010 | Gillanders |

(Continued)

FOREIGN PATENT DOCUMENTS

| | | |
|---|---|---|
| BE | 702179 | 1/1968 |
| EP | 0404315 | 12/1990 |

(Continued)

OTHER PUBLICATIONS

LANXESS Energizing Chemistry, Technical Information, Polymer Additives, Mesamoll® II, (2008) 4 pages.
LANXESS, Dr. Gupta Verlag—News, web page <http://www.gupta-verlag.com/general/news/industry/8149/Lanxess-expands-Mesamoll-prod . . . >, 2 pages (2011).
Lonza, Safety Data Sheet, Lonzacure M-DIPA; Version 26.10.2007/EN; 6 pgs.
Bayer MaterialScience, Safety Data Sheet (812254/05), Date of Issue: Mar. 31, 2006, Revised: Apr. 16, 2004; 5 pages.
Bayer MaterialScience; Bayer Sustainable Development Report 2005; pp. 60-61 (Subgroups and Service Companies).

(Continued)

*Primary Examiner* — William Phillip Fletcher, III

(57) ABSTRACT

Two-part coating compositions are described comprising an aliphatic cyclic secondary amine and methods of coating surfaces of a (e.g. drinking water) pipeline.

23 Claims, No Drawings

(56) References Cited

U.S. PATENT DOCUMENTS

2010/0266764 A1    10/2010    Robinson
2011/0070387 A1    3/2011    Schmidt

FOREIGN PATENT DOCUMENTS

| | | |
|---|---|---|
| EP | 0405722 | 1/1991 |
| EP | 0570798 | 11/1993 |
| EP | 1486522 | 12/2004 |
| JP | 2004-75906 | 3/2004 |
| RU | 2009127823 | 1/2011 |
| WO | WO 03/106527 | 12/2003 |
| WO | WO 2006/123142 | 11/2006 |
| WO | WO 2007/006656 | 1/2007 |
| WO | WO 2008/076665 | 6/2008 |
| WO | WO 2009/061679 | 5/2009 |
| WO | WO 2009/068259 | 6/2009 |
| WO | WO 2009/141058 | 11/2009 |
| WO | WO 2010/120617 | 10/2010 |
| WO | WO 2012/134662 | 10/2012 |

OTHER PUBLICATIONS

Bayer MaterialScience, Desmodur® N 3600; Ed. Dec. 11, 2006, 3 pgs.

Bayer MaterialScience, Desmodur® N 3400; Ed. Dec. 11, 2006; 3 pgs.

Lonza, Product Information Lonzacure® M-DIPA; Oct. 23, 2007, 1 page.

Bayer MaterialScience Product Information, Desmodur XP 2410 Aliphatic Polyisocyanate, undated, 1 page.

Saskatchewan Environment, Water Pipeline Design Guidelines, Apr. 2004, 13 pgs.

\* cited by examiner

COMPOSITION COMPRISING CYCLIC SECONDARY AMINE AND METHODS OF COATING DRINKING WATER PIPELINES

CROSS REFERENCE TO RELATED APPLICATIONS

This application is a national stage filing under 35 U.S.C. 371 of PCT/US2012/025917, filed Feb. 21, 2012, which claims priority to U.S. Provisional Application No. 61/469,231, filed Mar. 30, 2011, the disclosure of which is incorporated by reference in its entirety herein.

BACKGROUND

Trenchless methods for structural renovation of drinking water pipelines include the pipe in pipe method, pipe bursting method, and polyethylene thin wall lining method. As described in U.S. Pat. No. 7,189,429, these methods are disadvantaged by their inability to deal with multiple bends in a pipeline and the fact that lateral connection pipes to customers' premises have to be disconnected and then reinstated after execution of the renovation process.

U.S. Pat. No. 7,189,429 describes a method of forming a coating on the internal surface of a drinking water pipeline, the method comprising the steps of: a) providing a liquid, two-part coating system; b) mixing together the first part and the second part to form a mixture, and c) applying the mixture as a coating to said surface so as to form, at high cure rate, a monolithic lining which exhibits high strength and flexibility. Preferably the two parts of the system are applied through heated airless spray equipment. Such equipment may, for example, include a centrifugal spinning head or a self-mixing spray gun assembly.

U.S. Pat. No. 6,730,353 describes a coating for drinking water pipelines. The two-part coating system comprises a first part comprising one or more aliphatic polyisocyanates, optionally blended with one or more amine reactive resins and/or non reactive resins, and a second part comprising one or more aromatic polyamines optionally blended with one or more oligomeric polyamines, such that the two parts, when mixed together and applied to the internal surfaces of pipelines, form a rapid setting impervious coating suitable for contact with drinking water.

WO2010/120617 describes methods of forming a coating on (e.g. internal) surfaces of a (e.g. drinking water) pipeline with two-part coating compositions comprising a first part comprising at least one polyisocyanate and a second part comprising at least one aspartic acid ester. Also described is a reactive two-part coating composition that comprises a first part comprising at least one polyisocyanate; and a second part comprising at least one aspartic acid ester and at least one aromatic amine that is a solid at 25° C.

SUMMARY

Presently described is a two-part coating composition comprising an aliphatic cyclic secondary amine and methods of coating surfaces of a (e.g. drinking water) pipeline.

In one embodiment, the method comprises the steps of: a) providing a coating composition comprising a first part comprising at least one polyisocyanate, and a second part comprising at least 20 wt-% of aliphatic cyclic secondary amine comprising secondary amine substituents that lack ester groups; b) combining the first part and the second part to form a liquid mixture; c) applying the liquid mixture to internal surfaces of a pipeline at a caliper of at least 5 mm in a single pass; and d) allowing the mixture to set forming a cured continuous lining. The liquid mixture is typically applied at a caliper ranging from about 1 to 15 mm.

In another embodiment, the method comprises the steps of: a) providing a coating composition comprising; b) combining the first part and the second part to form a liquid mixture; c) applying the liquid mixture to internal surfaces of a pipeline at a caliper of at least 5 mm in a single pass; and d) and allowing the mixture to set forming a cured continuous lining.

In some favored embodiments, the aliphatic cyclic secondary diamine comprises two hexyl rings bonded by a bridging group. In other embodiments, the aliphatic cyclic secondary diamine comprises a single hexyl ring.

In another embodiment, a reactive two-part coating composition is described comprising a first part comprising at least one aliphatic polymeric isocyanate that is a derivative of hexamethylene diisocyanate and substantially free of isocyanate monomer; and a second part comprising at least one aliphatic cyclic secondary diamine having the general formula

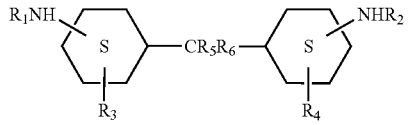

wherein $R_1$ and $R_2$ are independently linear or branched alkyl groups, having 1 to 10 carbon atoms and $R_3$, $R_4$, $R_5$ and $R_6$ are independently hydrogen or alkyl groups having 1 to 5 carbon atoms.

Coating compositions suitable for coating internal surfaces of drinking water pipeline are typically prepared from one or more aliphatic polymeric polyisocyanate(s) that are substantially free of isocyanate monomer such as derivatives of hexamethylene diisocyanate. Two-part compositions described herein are believed to comply with the requirements of NSF/ANSI Standard 61-2008.

DETAILED DESCRIPTION

The present invention provides a two-part coating system that can be applied to internal pipeline surfaces so as to form, at a high cure rate, an impervious lining suitable for contact with drinking water. By virtue of its rapid setting characteristics and insensitivity to moisture, the system of the present invention is particularly useful as an "in-situ" applied lining for refurbishment of existing drinking water pipelines.

The first part of the two-part coating composition generally comprises at least one polyisocyanate and the second part comprises at least one polyamine After application and curing, the coating composition comprises the reaction product of such first and second components. The reacted coating comprises urea groups (—NR—C(O)—NR—). Polymers containing urea groups are often referred to as polyureas. When the two-part coating composition comprises other isocyanate reactive or amine reactive components, the reacted coating may comprise other groups as well.

The first part of the two-part coating comprises one or more polyisocyanates. "Polyisocyanate" refers to any organic compound that has two or more reactive isocyanate (—NCO) groups in a single molecule such as diisocyanates, triisocyanates, tetraisocyanates, etc., and mixtures thereof.

Cyclic and/or linear polyisocyanate molecules may usefully be employed. The polyisocyanate(s) of the isocyanate component are preferably aliphatic.

Suitable aliphatic polyisocyanates include derivatives of hexamethylene-1,6-diisocyanate; 2,2,4-trimethylhexamethylene diisocyanate; isophorone diisocyanate; and 4,4'-dicyclohexylmethane diisocyanate. Alternatively, reaction products or prepolymers of aliphatic polyisocyanates may be utilized.

The first part generally comprises at least one aliphatic polyisocyanate. Such aliphatic polyisocyanate typically comprises one or more derivatives of hexamethylene-1,6-diisocyanate (HDI). In some embodiments, the aliphatic polyisocyanate is a derivative of isophorone diisocyanate. The aliphatic polyisocyanate may comprise an uretdione, biuret, and/or isocyanurate of HDI.

In some embodiments, the first part comprises at least one solvent-free aliphatic polyisocyanate(s) that is substantially free of isocyanate (HDI) monomer, i.e. less than 0.5% and more preferably no greater than 0.3% as measured according to DIN EN ISO 10 283. Various solvent-free aliphatic polyisocyanate(s) are available. One type of HDI uretdione polyisocyanate, is available from Bayer Material Science LLC, Pittsburg, Pa. (Bayer) under the trade designation "Desmodur N 3400". Another HDI polyisocyanate is a trimer, reported to have a viscosity of about 1200 mPas at 23° C. is available from Bayer under the trade designation "Desmodur N 3600". Such polyisocyanates typically have an isocyanate content of 20-25%. Another polyisocyanate is an aliphatic prepolymer resin comprising ether groups, based on HDI, reported to have a viscosity of 2500 mPas at 23° C. is available from Bayer under the trade designation "Desmodur XP 2599". Yet another aliphatic polyisocyanate resin based on HDI is available from Bayer under the trade designation "Desmodur N3800". This material has an NCO content of 11% and a viscosity of 6,000 mPa·s at 23° C. Yet another aliphatic polyisocyanate resin based on HDI and isophorone diisocyanate is available from Bayer under the trade designation "Desmodur NZ1". This material has an NCO content of 20% and a viscosity of 3,000 mPa·s at 23° C.

The first part may comprise a mixture of a first aliphatic polyisocyanate prepolymer having a viscosity of at least 2,000 or 2,500 mPa·s at 23° C., such as "Desmodur XP 2599", in combination with a lower viscosity polyisocyanate, having a viscosity of no greater than 1,500 mPa·s at 23° C., such as "Desmodur N 3600". The lower viscosity aliphatic polyisocyanate prepolymer is typically present at a weight ratio ranging from about 1:1 or 2:1 to 4:1 with a ratio of about 3:1 being preferred.

In another embodiment, the first part comprises a mixture of first aliphatic polyisocyanate prepolymer having a viscosity of at least 2,000 or 2,500 mPa·s at 23° C., such as "Desmodur XP 2599", in combination with a higher viscosity polyisocyanate, having a viscosity of at least 3,000 mPa·s at 23° C. such as "Desmodur NZ1". The higher viscosity polyisocyanate is typically present at a weight ratio ranging from about 2:1 to 1:2 with a ratio of about 2:1 being preferred.

In another embodiment, the first part comprises a mixture of first aliphatic polyisocyanate prepolymer having a viscosity of at least 3,000 mPa·s at 23° C., such as "Desmodur NZ1", in combination with a higher viscosity polyisocyanate, having a viscosity of at least than 5,000 or 6,000 mPa·s at 23° C. such as "Desmodur N3800". The aliphatic isocyanates are typically present at a weight ratio ranging from about 2:1 to 1:2 with a ratio of about 1:1 being preferred.

In yet another embodiment, the first part comprises a three component mixture of aliphatic polyisocyanates. Each of the three components may be present in an amount ranging from about 20 to 50 wt-% of the first part. The three component mixture may comprise at least one trimer, such as "Desmodur N 3600" and at least one aliphatic prepolymer resin comprising ether groups, such as "Desmodur XP 2599".

In some embodiments, the first part is substantially free of other "amine reactive resin(s)" i.e. a resin containing functional groups capable of reacting with primary or secondary amines. For example, the first part is typically free of aromatic amine reactive resins. The first part may also be free of epoxy functional compounds and compounds containing unsaturated carbon-carbon bonds capable of undergoing "Michael Addition" with polyamines, (e.g. monomeric or oligomeric polyacrylates). The first part may optionally comprise non-reactive resins or the composition may be free of non-reactive resins.

The second part of the two part coating comprises one or more polyamines. As used herein, polyamine refers to compounds having at least two amine groups, each containing at least one active hydrogen (N—H group) selected from primary amine or secondary amine. In some embodiments, the second component comprises or consists solely of one or more secondary amines.

In a preferred coating composition, as described herein the amine component comprises at least one aliphatic cyclic secondary diamine. Unlike aspartic acid ester, the secondary amine substituents lack ester groups.

In one embodiment, the second part comprises one or more aliphatic cyclic secondary diamines that comprise two, optionally substituted, hexyl groups bonded by a bridging group. Each of the hexyl rings comprise a secondary amine substituent.

The aliphatic cyclic secondary diamine typically has the general structure:

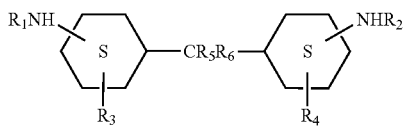

wherein $R_1$ and $R_2$ are independently linear or branched alkyl groups, having 1 to 10 carbon atoms. $R_1$ and $R_2$ are typically the same alkyl group. Representative alkyl groups include methyl, ethyl, propyl, isopropyl, butyl, isobutyl, secondary butyl, tertiary butyl, and the various isomeric pentyl, hexyl, heptyl, octyl, nonyl, and decyl groups. The symbol "S" in the center of the hexyl rings indicates that these cyclic groups are saturated. The preferred $R_1$ and $R_2$ contain at least three carbons, and the butyl group is particularly favored, such as a sec-butyl group.

$R_3$, $R_4$, $R_5$ and $R_6$ are independently hydrogen or a linear or branched alkyl group containing 1 to 5 carbon atoms. $R_3$, and $R_4$ typically the same alkyl group. In some embodiments, $R_5$ and $R_6$ are hydrogen. Further. Is some embodiments, $R_3$, and $R_4$ are methyl or hydrogen.

The substituents are represented such that the alkylamino group may be placed anywhere on the ring relative to the $CR_5R_6$ group. Further, the $R_3$ and $R_4$ substituents may occupy any position relative to the alkylamino groups. In some embodiments, the alkylamino groups are at the 4,4'-positions relative to the $CR_5R_6$ bridge. Further, the $R_3$ and $R_4$ substituents typically occupy the 3- and 3'-positions.

Commercially available aliphatic cyclic secondary diamines having this structure include:

| Chemical Tradename (Supplier, Location) | Name | Chemical Structure |
|---|---|---|
| "Clearlink 1000" (Dorf Ketal Chemicals LLC, Stafford, TX) | Cyclohexanamine, 4,4'-methylenebis(N-(1-methylpropyl)- | |
| "Clearlink 3000" (Dorf Ketal Chemicals LLC) | 3,3'-dimethylcyclohexanamine, 4,4'-methylenebis(N-(1-methylpropyl)- | |

In another embodiment, the second part comprises one or more aliphatic cyclic secondary diamines that comprise a single hexyl ring. The aliphatic cyclic secondary diamine typically has the general structure:

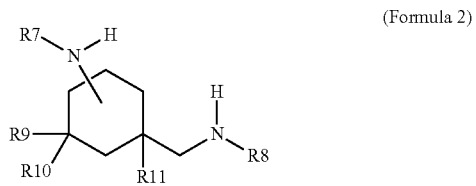

(Formula 2)

wherein $R_7$ and $R_8$ are independently linear or branched alkyl groups, having 1 to 10 carbon atoms or an alkylene group terminating with a —CN group. $R_7$ and $R_8$ are typically the same group. Representative alkyl groups include the same as those described above for $R_1$ and $R_2$. In one embodiment, $R_7$ and $R_8$ are alkyl groups having at least three carbons, such as isopropyl. In another embodiments, $R_7$ and $R_8$ are short chain (e.g. C1-C4) alkylene groups, such as ethylene, terminating with a —CN group.

$R_9$, $R_{10}$ and $R_{11}$ are independently hydrogen or a linear or branched alkyl group having 1 to 5 carbon atoms. $R_9$, $R_{10}$ and $R_{11}$ are typically the same alkyl group. In some embodiments, $R_9$, $R_{10}$ and $R_{11}$ are methyl or hydrogen. In one embodiment $R_9$, $R_{10}$ and $R_{11}$ are methyl groups.

The substituents are represented such that the alkylamino group may be placed anywhere on the ring relative to the —$NR_8$ group. In some embodiments, the alkylamino group is 2 or 3 positions away from the —$NR_8$. The preferred alkylamine group is two positions away from the ≥$NR_8$ group on the cyclohexyl ring.

In some embodiments, the aliphatic cyclic secondary diamine is prepared by the reaction product of (1 equivalent of) isophorone diamine and (2 equivalents of) a Michael acceptor group that reduces the nucleophilicity of the resulting secondary amine groups. Representative Michael acceptors include acrylonitrile and 4-unsaturated carbonyl compounds, with acrylonitrile typically preferred. In some embodiments, the alkylene group between the terminal —CN group and the amine group has at least two carbon atoms.

Commercially available aliphatic cyclic secondary diamines having this structure include:

| Chemical Tradename (Supplier, Location) | Chemical Structure |
|---|---|
| "HXA CE 425" (Hanson Group LLC., Alpharetta, GA) | |
| "Jefflink 754" (Huntsman, The Woodlands, TX) | |

In some embodiments, one or more aliphatic cyclic secondary diamine(s) are the sole isocyanate-reactive component(s). The isocyanate-reactive component of the second part may include a single species according to Formula 1, a single species according to Formula 2, a combination of a species of Formula 1 with Formula 2, a well as various other combinations. Hence, the composition is free of other isocyanate-reactive components, such as hydroxyl-functional components. The second part typically comprises at least 20 wt-% or 25 wt-% of aliphatic cyclic secondary diamine with the remainder of the second part comprising a major amount of filler and a minor amount of optional additives, such as pigments. In some embodiments, the second part may comprise no greater than 30 wt-%, 35 wt-%, 40 wt-% or 45 wt-% of aliphatic cyclic secondary diamine.

When the second part comprises solely of one or more aliphatic cyclic secondary diamines the first part is free of aromatic amine reactive resins. Since the first part is also typically free of aromatic components, the entire composition (i.e. first and second part) is free of aromatic components.

In other embodiments, the aliphatic cyclic secondary diamine is combined with one or more secondary aliphatic polyamine (including other cycloaliphatic polyamines) having a different structure than Formulas 1 and 2. The other secondary aliphatic polyamine may include aspartic acid esters, such as described in WO 2010/120617. Further, the other secondary aliphatic polyamine may include an acyclic aliphatic linear or branched polyamines (i.e. that lacks a cyclic group).

In this embodiment, the second part may comprise up to about 75 wt-% of such other secondary aliphatic polyamines.

Commercially available aliphatic acyclic secondary diamines include the following:

| Chemical Tradename (Supplier, Location) | Chemical Structure |
|---|---|
| "Ethacure 90" Albemarle Corporation (Baton Rouge, LA) | 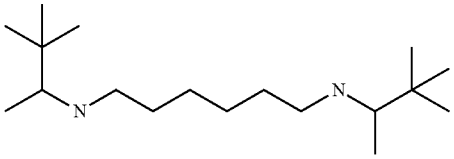 [SMILES: CC(NCCCCCCNC(C)C(C)(C)C)C(C)(C)C] |
| "Jeffamine SD-231" and "Jeffamine SD-401" (Huntsman, The Woodlands, TX) | 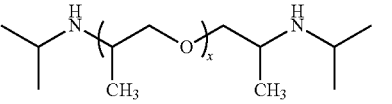 | wherein x average about 2.5 to about 6, and Mw = ranges from 300 g/mole to 600 g/mole In favored embodiments, the other aliphatic secondary diamine components are utilized at a lower concentration as to not detract from the beneficial properties provided by the aliphatic cyclic secondary diamine (e.g. of Formula 1 and/or 2). Hence, when present the concentration is typically no greater than 40 wt-% or 30 wt-% of the first part.

When present the optional other amine components are chosen to dissolve in the liquid aliphatic cyclic secondary diamine (e.g. of Formula 1 and/or 2).

The first and/or second part typically comprises a filler. A filler is a solid, insoluble material often employed to add bulk volume or to extend the pigments capabilities without impairing the reactive chemistry of the coating mixture. Unlike pigments that have desirable optical properties and are often relatively expensive, fillers typically do not possess such optical properties and are generally less expensive than pigments. Many fillers are natural inorganic minerals such as talc, clay, calcium carbonate, kaolin, whiting, and silica. Other exemplary fillers includes ceramic microspheres, hollow polymeric microspheres such as those available from Akzo Nobel, Duluth, GA under the trade designation "Expancel 551 DE"), and hollow glass microspheres (such as those commercially available from 3M Company, St. Paul, Minn. under the trade designation "K37". Hollow glass microspheres are particularly advantageous because they demonstrate excellent thermal stability and a minimal impact on dispersion viscosity and density.

In some embodiments, a filler, such as calcium magnesium carbonate or calcium carbonate, is employed in the first part at a concentration of at least 5 wt-%, or 10 wt-%, 15 wt-%, or 20 wt-% to about 40 wt-%. In some embodiments, both the first and second part comprise filler. The second part may comprise filler at an even higher concentration than the first part. The filler concentration of the second part may ranges from about 50 wt-% to about 70 wt-%.

Other filler may be more or less dense than calcium carbonate. Overall the total composition typically comprises at least about 5%, 10% or 15% to about 45% by volume inorganic particulate filler.

The first and/or second part may comprise various additives as are known in the art, provided the inclusion of such is permitted with the requirements of the NSF/ANSI Standard. For example, pigments, dispersing and grinding aids, water scavengers, thixotropes, defoamers, etc. can be added to improve the manufacturability, the properties during application and/or the shelf life.

The stoichiometry of the polyurea reaction is based on a ratio of equivalents of isocyanate (e.g. modified isocyanate and excess isocyanate) of the first component to equivalents of amine of the second component. The first and second components are reacted at a stoichimetric ratio of at least about 1:1. Preferably, the isocyanate is employed in slight excess, such that the first part is combined with the second part at a ratio of 1.25 to 1.35 equivalents isocyanate to amine. The first part is generally combined with the second part at a volume ration of about 1:1.

The first and second parts are preferably each liquids at temperatures ranging from 5° C. to 25° C. In view of the confined spaces within the pipeline and the resultant lack of suitable outlet for vapor, both the first part and the second part are substantially free of any volatile solvent. That is to say, solidification of the system applied to the pipeline interior is not necessitated by drying or evaporation of solvent from either part of the system. To further lower the viscosity, one or both parts can be heated. Further, the coating composition has a useful shelf life of at least 6 months, more preferably, at least one year, and most preferably, at least two years.

Although a wide range of formulations are possible, such as exemplified in the forthcoming examples, the coating compositions described herein are particularly suitable for water distribution pipes, typically having a diameter ≥3 inches (7.6 cm) up to about 36 inches (91 cm), it is generally desired that the cured coating has sufficient toughness (i.e. flexural strength) and ductility (i.e. flexibility as characterized by elongation at break) to remain continuous in the event of a subsequent circumferential fracture of a partially deteriorated (e.g. cast iron) pipe such that the cured coating continues to provide a water impervious barrier between the flowing water and internal surfaces of the pipe. The following table describes typical and preferred properties of cured coating compositions for water distribution pipes as determined by the test methods described in the examples.

PREFERRED PERFORMANCE RANGES
FOR STRUCTURAL COATINGS

| Physical Property | Typical Property | Preferred Range | ASTM F 1216-09 initial physical property target |
|---|---|---|---|
| Thickness (mm) | 1-15 | n/a | n/a |
| Film Set Time (sec) | 30-180 | 30-120 | n/a |
| Tensile strength (MPa) | 20-45 | 25-45 35-45 | >21 |
| Tensile Elongation (%) | 1-30 | 2-10 | n/a |
| Flexural Modulus (MPa) | 1700-4500 | 2000-4500 | >1700 |
| Flexural Strength (MPa) | 30-60 | 40-60 | >30 |
| Tg (° C.) | 25-160 | 75-160 | n/a |
| Water Absorption (%) | <2% | <1.5 | n/a |

The coating compositions described herein advantageous provide these desired properties while complying with NSF/ANSI Standard 61-2008 (i.e. the standard for the United States) and are also believed to comply with Regulation 31 of the Water Supply (Water Quality) Regulations (i.e. the standard for the United Kingdom).

The coating composition is typically applied directly to the internal surfaces of a pipe without a primer layer applied to the surface. This can be done using various spray coating techniques. Typically, the amine component and the isocyanate component are applied using a spraying apparatus that allows the components to combine immediately prior to exiting the apparatus. In carrying out the method of the invention, the first and second parts of the system are fed independently, e.g. by flexible hoses, to a spraying apparatus capable of being propelled through an existing pipeline to be renovated. For example, a remote controlled vehicle, such as described in US 2006/0112996, may enter the pipeline to convey the spraying apparatus through the pipeline. The apparatus preferably heats the two parts of the system prior to application to the pipeline interior and mixes the two parts immediately before applying the mixture to the interior surface of the pipeline. The mixture of the two parts cures on the interior surface of the pipeline to form a (e.g. monolithic) water impervious lining. Such linings may be formed when the pipeline is initially laid, or after a period of use when the pipeline itself begins to deteriorate. Notably, the composition described herein can be applied at a caliper of at least 5 mm in a single pass forming a cured continuous lining.

A variety of spray systems may be employed as described in the art. In some embodiments, a heated airless spray apparatus, such as a centrifugal spinning head is employed. An airless, impingement mixing spray system generally includes the following components: a proportioning section which meters the two components and increases the pressure to above about 1500 psi (10.34 MPa); a heating section to raise the temperatures of the two components (preferably, independently) to control viscosity; and an impingement spray gun which combines the two components and allows mixing just prior to atomization. In other embodiments, a heated air vortex spray apparatus can be used to apply the coating.

In some embodiments and in particular when the liquid mixture is applied by spraying, the first and second part typically each have a (Brookfield) viscosity ranging from about 5,000 centipoise to about 60,000 cps, using spindle 6 at the temperature at which the liquid mixture is applied. The temperature at which the liquid mixture is applied typically ranges from about 15° C. to 50° C.

Viscosity behavior of the each of the two components is important for two part spray-coating processes. With impingement mixing, the two parts should be as close as possible in viscosity at high shear rates to allow adequate mixing and even cure. The plural component static mix/spray system appears to be more forgiving of viscosity differences between the two components. Characterization of viscosities as functions of shear rate and temperature can help with decisions as to starting point for temperatures and pressures of the coatings in the two part spray equipment lines.

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

These abbreviations are used in the following examples: s=seconds, min=minute, ppb=part per billion, hr=hour, L=liter, mL=milliliter; wt=weight, gpm=gallons per minute, V=volts, cP=centipoise, MPa=megapascals, RPM=revolutions per minute, HP=horsepower.

| Materials | |
|---|---|
| Material Name | Description |
| Desmodur N3800 | Solvent-free, flexibilizing aliphatic polyisocyanate resin based on hexamethylene diisocyanate (HDI). NCO content 11.0. Viscosity 6,000 mPa·s @ 23° C. Commercially available from Bayer Material Science LLC, Pittsburg, PA. |
| Desmodur NZ1 | Solvent-free aliphatic polyisocyanate resin based on hexamethylene diisocyanate (HDI) and isophorone diisocyanate (IPDI). NCO content 20.0%. Viscosity 3,000 mPa·s @ 23° C. Commercially available from Bayer Material Science LLC, Pittsburg, PA. |
| Desmodur N3600 | Solvent free polyfunctional polyisocyanate resin based on hexamethylene diisocyanate (HDI). NCO content 23.0%. Viscosity 1200 mPa·s @ 23° C. Commercially available from Bayer Material Science LLC, Pittsburg, PA. |
| Desmodur XP2599 | Aliphatic prepolymer containing ether groups and based on hexamethylene-1,6-diisocyanate (HDI). Commercially available from Bayer Material Science LLC, Pittsburg, PA. |
| Cab-O-Sil TS720 | Medium surface area fumed silica which has been surface modified with polydimethylsiloxane. Commercially available from Cabot Corporation, Bilerica, MA |

-continued

Materials

| Material Name | Description |
| --- | --- |
| Purmol 3ST | Alkali aluminosilicate molecular sieve powder with 3 Angstrom pore diameter commercially available from Zeochem LLC., Louisville, KY. |
| TiPure R900 | Rutile titanium dioxide pigment manufactured by the chloride process for general interior coatings applications. Commercially available from DuPont Titanium Technologies, Wilmington, DE. |
| Omycarb 5-FL | A beneficiated calcium carbonate with an intermediate and closely sized particle distribution commercially available from Omya Inc., Proctor, VT. |
| Microdol H600 | Calcium magnesium carbonate filler commercially available from Bentley Chemicals, Kidderminster, Worcestershire, UK |
| Clearlink 1000 | Light-stable, aliphatic, cyclic, secondary diamine commercially available from Dorf Ketal Chemicals LLC, Stafford, TX. 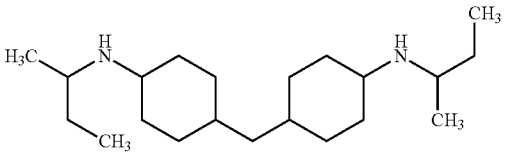 |
| Bayferrox 318M | Synthetic black iron oxide pigment commercially available from Lanxess, Pittsburg, PA |
| Vynamon Blue 515303 | Cu-phthalocyanine Blue pigment commercially available from Heucothech LtD., Fairless Hill, PA |
| Tiona 595 | Titanium dioxide pigment commercially available from Cristal Global, Australind, WA. |
| Mesamoll | Liquid mixture of alklysulfonic phenyl ester commercially available from Lanxess, Pittsburg, PA |
| Jeffamine SD-231 | Liquid acyclic difunctional polyether secondary diamine commercially available from Huntsman, The Woodlands, TX. |
| Jeffamine SD-401 | Liquid acyclic acyclic functional polyether secondary diamine commercially available from Huntsman, The Woodlands, TX. |
| HXA CE 425 | Aliphatic cyclic diamine chain extender commercially available from the Hanson Group LLC., Alpharetta, GA |
| Ethacure 90 | Aliphatic acyclic diamine chain extender commercially available from Albemarle Corporation, Baton Rouge, LA |

Resin Blending

Resin formulations were blended using a 3 HP, high speed dispersion Ross Mixer (Charles Ross and Son Company, St. Charles, Ill.) with a vacuum attachment. Formulation components were charged into a mixing vessel equipped with a Cowles mixing blade at 900 RPM over the course of 5 min. Then vacuum was applied to the mixing vessel and mixing continued for an additional 5 min at 1000 RPM.

Sample Production

The general process for producing a sample part for testing involved a) loading a two-part cartridge with Part A and Part B chemistries; b) heating the cartridge to 35-40° C.; c) dispensing the cartridge using a pneumatic cartridge dispenser or mechanically driven cartridge dispensing system through a ⅜", 64 element static mixer made of commercially available static mixer elements such as those found in Brandywine Materials, LLC Burlington, Mass. Statomix MC 10-32; and d) dispensing the blended resin from the static mixer into a closed mold, open faced mold, or into a spinning cone where it was centrifugally applied to the interior of a pipe. When the blended resin is applied into a spinning cone, the spinning cone is placed onto a translational stage that moves within a pipe interior at a fixed speed. The volumetric flow rate of the applied resin is determined to coincide with the translational speed of the spinning cone relative to the interior of the pipe, thus it is possible to achieve a determined coating thickness. Post-lining coating measurements can be taken by using a caliper gauge such as a Mitutoyo Absolute IP 67 available from Mitutoya Corp., Japan.

Test Methods

1. Flexural Modulus and Strength ASTM D790-07

Instron with a 5 kN load cell was used along with Bluehill software to report both values. The test specimens were 120 mm×10 mm×4 mm injection molded bars ("Teflon" molds). The support span was 64 mm and the crosshead speed was 1.7 mm/min.

2. Tensile Strength at Break and Elongation at Break ASTM D638-08

Instron with Fixed Grips, 5 kN load cell. Type I Class C Extensometer was used to determine Poisson's Ratio. Bluehill Software was used to report both values. Test specimen was Type IV with a thickness of 3.3±.0.1 mm, injection molded into a "Teflon" die. Speed of testing was 2 in/min and conditioning was to allow samples to cure for 7 days in desiccator.

3. Hardness-Shore D ASTM D2240-05

Type D Ergo Style Analog Durometer Model 409 was used with a conical indentor. No operating stand was used. Instead it was hand held as per section 9.2. No additional mass used and conditioning was to allow samples to cure for 7 days. Testing was done at room conditions.

4. Glass Transition Temperature (Tg) ASTM D7028-07
   Composites were measured by dynamic mechanical analysis using a Seiko DMS 200 with a heating rate of 2° C./min Conditioning was to allow the samples to cure for 7 days in a desiccator.
5. Impact Resistance ASTM D2794-93
   BYK Heavy-Duty Impact Tester was used with indenter diameter of 0.625 in, guide tube of 40 in, weights of 2, 4, and 8 lbs. The test specimen substrate was 4"×4"×¼" bead blasted cold rolled steel. This is a deviation from the ASTM which calls for 24 gage steel panels treated with a conversion coating. Coating thickness as indicated in Table 5. Conditioning was to allow samples to cure for 7 days at 23° C. and 50% relative humidity. Failure was determined using magnification. Copper sulfate solution and pinhole detectors were not used.
6. Water Absorption ASTM D570-98 Water Absorption of Plastics
   The test specimen was the section 5.2 ISO standard specimen. Procedure 7.1 was used—24 hr immersion in 23±1° C. deionized water. Conditioning was to cure for 7 days in a desiccator and reconditioning was another 7 days in a desiccator. The average weight increase and soluble matter lost of 4 samples was reported.
7. Abrasion Resistance (mg loss/1000 cycles) ASTM D4060-07 using CS 17 wheels.
8. Viscosity: Measured at various temperatures, RPM's and spindles as indicated in Table 3 using a Brookfield DV+II Pro viscometer commercially available from Brookfield Engineering Laboratories, Inc., Middelboro, Mass.
9. Density: Measured using an Accupyc 1330 gas pycnometer from Micromeritics Norcross, Ga.

Comparative Example A (CE A)

Commercially available from 3M company, St.Paul, Minn. as "3M Scotchkote Rapid Setting Polymeric Lining 169" (diethyltoluenediamine, epoxy resin, hexamethylene diisocyanate polymer)

Comparative Example B (CE B)

Commercially available from 3M company, St.Paul, Minn. as "3M Scotchkote Rapid Setting Polymeric Lining 169HB" (diethyltoluenediamine, epoxy resin, hexamethylene diisocyanate polymer, poly[oxy(methyl-1,2-ethanediyl)], .alpha.-hydro-.omega.-hydroxy-, polymer with 1,6-diisocyanatohexane)

Comparative Example C (CE C)

The polyurea described in Example 2 of WO2010/120617.

Examples 1-9

Resins and additives for Part A and Part B were blended as described under "Resin Blending" according to the formulations in Table 1 and 2 respectively. Part A and B were then mixed as described under "Sample Production".

TABLE 1

Part A

| MATERIAL | EX1 | EX2 | EX3 | EX4 | EX5 | EX6 | EX7 | EX8 | EX9 |
|---|---|---|---|---|---|---|---|---|---|
| | | | | | % by weight | | | | |
| Desmodur N3800 | 0 | 0 | 0 | 0 | 0 | 0 | 0 | 48.70 | 0 |
| Desmodur NZ1 | 0 | 0 | 0 | 0 | 32.30 | 52.65 | 0 | 48.70 | 67.31 |
| Desmodur N3600 | 48.00 | 52.18 | 48.65 | 51.90 | 0 | 0 | 29.14 | 0 | 0 |
| Desmodur XP25990 | 16.00 | 17.39 | 16.22 | 12.97 | 15.30 | 22.57 | 29.14 | 0 | 28.85 |
| Tiona 595 | 1.00 | 1.00 | 1.00 | 1.00 | 1.33 | 1.00 | 1.12 | 0 | 0 |
| Cab-O-Sil TS720 | 1.70 | 1.80 | 1.50 | 1.50 | 0 | 1.90 | 0.60 | 1.40 | 1.92 |
| Purmol 3ST | 4.25 | 2.00 | 2.00 | 2.00 | 2.03 | 1.25 | 3.00 | 0.60 | 0.96 |
| TiPure R900 | 0 | 0 | 0 | 0 | 0 | 0 | 0 | 0.60 | 0.96 |
| Omycarb 5-FL | 0 | 25.00 | 30.00 | 30.00 | 48.30 | 20.00 | 37.00 | 0 | 0 |
| Microdol H600 | 28.40 | 0 | 0 | 0 | 0 | 0 | 0 | 0 | 0 |
| Mesamoll | 0.65 | 0.63 | 0.63 | 0.63 | 0.83 | 0.63 | 0 | 0 | 0 |

TABLE 2

Part B

| MATERIAL | EX1 | EX2 | EX3 | EX4 | EX5 | EX6 | EX7 | EX8 | EX9 |
|---|---|---|---|---|---|---|---|---|---|
| | | | | | % by weight | | | | |
| Clearlink 1000 | 29.0 | 31.70 | 34.20 | 37.00 | 32.07 | 29.30 | 33.00 | 39.70 | 39.74 |
| Cab-O-Sil TS720 | 3.20 | 3.30 | 3.30 | 3.30 | 3.30 | 3.30 | 1.00 | 3.30 | 3.31 |
| Bayferrox 318M | 0.10 | 0.13 | 0.13 | 0.13 | 0.13 | 0.13 | 0.13 | 0.30 | 0 |
| Omycarb 5-FL | 0 | 64.87 | 62.37 | 59.57 | 64.50 | 67.27 | 65.87 | 56.20 | 56.29 |
| Vynamon Blue 515303 | 0 | 0 | 0 | 0 | 0 | 0 | 0 | 0 | 0.66 |
| Microdol H600 | 67.70 | 0 | 0 | 0 | 0 | 0 | 0 | 0 | 0 |

TABLE 3

| Viscosity Example 1 (spindle 6) | | | | |
| --- | --- | --- | --- | --- |
| RPM | Part A (cP) | | Part B (cP) | |
| 0.5 | 394000 | 324000 | 484000 | 322000 |
| 1 | 234000 | 166000 | 246000 | 134000 |
| 5 | 76800 | 53400 | 70000 | 42800 |
| 10 | 52300 | 32900 | 44000 | 25500 |
| 20 | 37600 | 22650 | 32000 | 17200 |
| ° C. | 23 | 40 | 23 | 41 |

TABLE 4

| Viscosities Example 2-7 and CE A-C * | | | | | | | | | |
| --- | --- | --- | --- | --- | --- | --- | --- | --- | --- |
|  | EX2 | EX3 | EX4 | EX5 | EX6 | EX7 | CEA | CEB | CEC |
| Part A (cP) | 28450 | 37350 | 28950 | 25500 | 32400 | >50000 | 9000 | 24000 | 18500 |
| Part B (cP) | 29900 | 31300 | 15000 | 24950 | 32000 | 22850 | 28800 | 40500 | 35000 |

* 23° C., 20 RPM except 50 RPM for CE A Part B, spindle 6 except spindle 5 for all CE (with exception that CE C part B was spindle 6)

TABLE 5

| | EX1 | EX2 | EX3 | EX4 | EX5 | EX6 | EX7 | EX8 | EX9 | CEA | CEB | CEC |
| --- | --- | --- | --- | --- | --- | --- | --- | --- | --- | --- | --- | --- |
| Density g/cm³ | 1.46 | NM | NM | NM | NM | NM | NM | NM | NM | 1.97 | 1.24 | 1.25 |
| Tensile stress @ break | 40 | NM | NM | NM | NM | NM | NM | NM | NM | 38 | 19 | 16 |
| Tensile strain @ break | 5% | NM | NM | NM | NM | NM | NM | NM | NM | 5% | 88% | 85% |
| Flex modulus MPa | 3180 | 2393 | 2620 | 2299 | 2419 | 2131 | 2229 | 2728 | 2113 | 2697 | 391 | 466 |
| Flexural Strength MPa | 56 | 51 | 59 | 50 | 48 | 45 | 39 | 39 | 58 | 43 | 15 | 14 |
| Hardness Shore D | 86 | NM | NM | NM | NM | NM | NM | NM | NM | 86 | 70 | 65 |
| Impact Resistance (J) | 16 @ 1.5 mm; >36 @ 6 mm | NM | NM | NM | NM | NM | NM | NM | NM | 2.5 @ 3 mm | NM | >36 @ 3.5 mm |
| Abrasion resistance (mg loss per 1000 cycles) | 180 | NM | NM | NM | NM | NM | NM | NM | NM | 390 | 210 | 214 |
| Tg ° F. (° C.) | 205 (96) | NM | NM | NM | NM | NM | NM | NM | NM | 302 (150) | 221 (105) | 123 (51) |
| Water absorption % in 24 hrs (21 days) | 0.76 (1.16 @ 28 days) | NM | NM | NM | NM | NM | NM | NM | NM | 0.20 (1.01) | NM (NM) | 1.78 (2.82) |

NM = not measured

TABLE 6

| | EX1 | EX2 | EX3 | EX4 | EX5 | EX6 | EX7 | EX8 | EX9 | CEA | CEB | CEC |
| --- | --- | --- | --- | --- | --- | --- | --- | --- | --- | --- | --- | --- |
| [1]Total % volume of "fillers" | 27.6 | 25.9 | 26.1 | 24.8 | 24.8 | 25.8 | 29.7 | 15.6 | 15.6 | 12.5 | 4.4 | 3.7 |
| >5 mm caliper in 1 coat pass? | Yes | Yes | Yes | Yes | Yes | Yes | Yes | Yes | Yes | No | No | No |
| [2]NSF/ANSI 61-2008 compliant? | Yes | Yes | Yes | Yes | Yes | NM | NM | NM | NM | Yes | No | Yes |
| % excess isocyanate | 30 | 30 | 20 | 20 | 30 | 20 | 5 | 10 | 10 | | | |
| A:B volume mix ratio | 1:1 | 1:1 | 1:1 | 1:1 | 3:2 | 1:1 | 1:1 | 1:1 | 1:1 | 2.5:1 | 2.5:1 | 1:1 |

NM = not measured

[1] = for the purposes of the % volume filler calculation only the amounts of Microdol H600 (calcium magnesium carbonate), Omycarb 5-FL (calcium carbonate) and Barytes (barium sulfate, used in Comparative example A) were considered "fillers".
[2] = EX1, CEA, CEC used NSF/ANSI 61-2008 with sample surface/volume ratio of 61 in²/L

Examples 10-14

Examples 10-14 include formulations that contained no fillers and acyclic secondary amine. Resins and additives for Part A and Part B were blended as described under "Resin Blending" according to the formulations in Table 7 and 8 respectively. Part A and B were then mixed as described under "Sample Production".

TABLE 7

| | Part A | | | | |
| --- | --- | --- | --- | --- | --- |
| MATERIAL | EX10 | EX11 | EX12 | EX13 | EX14 |
| | % by weight | | | | |
| Desmodur N3400 | 30 | 30 | 30 | 30 | 30 |
| Desmodur N3600 | 30 | 30 | 30 | 30 | 30 |
| Desmodur XP2599 | 40 | 40 | 40 | 40 | 40 |

TABLE 8

| | Part B | | | | |
| --- | --- | --- | --- | --- | --- |
| MATERIAL | EX10 | EX11 | EX12 | EX13 | EX14 |
| | % by weight | | | | |
| Clearlink 1000 | 75 | 75 | 75 | 0 | 50 |
| Ethacure 90 | 0 | 0 | 0 | 0 | 50 |
| SD-231 | 25 | 0 | 0 | 0 | 0 |
| SD-401 | 0 | 25 | 0 | 0 | 0 |
| HXA CE 425 | 0 | 0 | 25 | 100 | 0 |

TABLE 9

| Example | EX10 | EX11 | EX12 | EX13 | EX14 |
| --- | --- | --- | --- | --- | --- |
| Tensile stress @ break (MPa) | 15 | 16 | 23 | 24 | 23 |
| Tensile strain @ break (%) | 88 | 69 | 37 | 68 | 23 |
| Flex modulus MPa | NM | NM | NM | NM | 616 |
| Flexural Strength MPa | NM | NM | NM | NM | 33 |
| % excess isocyanate | 0 | 0 | 0 | 0 | 0 |
| A:B weight mix ratio | 100:60.3 | 100:66.9 | 100:58.0 | 100:51.2 | 100:51.8 |

What is claimed is:

1. A method of forming a coating on a surface of a pipeline the method comprising the steps of:
   a) providing a coating composition comprising
      a first part comprises at least one polyisocyanate, and
      a second part comprising at least 20 wt-% of aliphatic cyclic secondary diamine comprising secondary amine substituents that lack ester groups;
   b) combining the first part and the second part to form a liquid mixture wherein the liquid mixture comprises about 15% to about 30% by volume inorganic particulate filler such that the liquid mixture can be applied at a caliper of at least 5 mm in a single pass;
   c) applying the liquid mixture to internal surfaces of the pipeline; and
   d) allowing the mixture to set forming a cured coating.

2. The method of claim 1 wherein the second part comprise an aliphatic cyclic secondary diamine comprising two hexyl rings bonded by a bridging group.

3. The method of claim 2 wherein the aliphatic cyclic secondary diamine has the general formula:

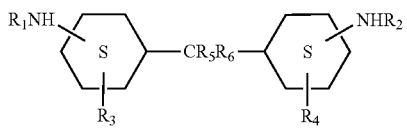

wherein $R_1$ and $R_2$ are independently alkyl groups, having 1 to 10 carbon atoms and $R_3$, $R_4$, $R_5$ and $R_6$ are independently hydrogen or alkyl groups having 1 to 5 carbon atoms.

4. The method of the previous claim 3 wherein $R_1$ and $R_2$ are independently alkyl groups comprising at least 2 carbon atoms.

5. The method of claim 3 wherein $R_3$ and $R_4$ are methyl or hydrogen.

6. The method of claim 3 wherein $R_5$ and $R_6$ are hydrogen.

7. The method of claim 1 wherein the second part comprises an aliphatic cyclic secondary diamine comprising a single hexyl ring.

8. The method of claim 7 wherein the aliphatic cyclic secondary diamine has the general formula:

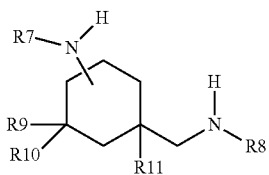

wherein $R_7$ and $R_8$ are independently linear or branched alkyl groups having 1 to 10 carbon atoms, or an alkylene group terminating with a —CN group, and $R_9$, $R_{10}$ and $R_{11}$ are independently hydrogen or an alkyl groups containing 1 to 5 carbon atoms.

9. The method of claim 8 wherein $R_7$ and $R_8$ are independently alkyl groups comprising at least 3 carbon atoms.

10. The method of claim 8 wherein $R_9$, $R_{10}$ and $R_{11}$ are independently hydrogen or an alkyl groups containing 1 to 5 carbon atoms.

11. The method of claim 1 wherein the pipeline is a drinking water pipeline and the cured coating comes in contact with the drinking water.

12. The method of claim 1 wherein the second part comprises one or more of the aliphatic cyclic secondary diamine(s) in an amount ranging from 25 wt-% to 45 wt-% of the second part.

13. The method of claim 1 wherein the second part further comprises aliphatic acyclic secondary diamines.

14. The method of claim 1 wherein the first and second parts are free of aromatic compounds.

15. The method of claim 1 wherein the second part is free of hydroxy-functional components.

16. The method of claim 1 wherein the first part comprises a mixture of aliphatic polyisocyanates that are substantially free of isocyanate monomer.

17. The method of claim 1 wherein the first part is combined with the second part at a ratio of 1.25 to 1.35 equivalents isocyanate to amine.

18. The method of claim 1 wherein the first and second part each have a viscosity ranging from 5,000 centipoise to 60,000 centipoise with a spindle speed of 20 rpm at a temperature at which the liquid mixture is applied.

19. The method of claim 1 wherein the coating composition has a film set time of 30 to 180 seconds.

20. The method of claim 1 wherein the cured coating composition has a tensile strength ranging from 25 to 45 Mpa.

21. The method of claim 1 wherein the cured coating composition has a tensile elongation ranging from 2 to 10%.

22. The method of claim 1 wherein the cured coating composition has a flexural modulus ranging from 2000-4500 MPa.

23. A reactive two-part coating composition, comprising:
a first part comprising at least one aliphatic polymeric isocyanate that is a derivative of hexamethylene diisocyanate and substantially free of isocyanate monomer;
a second part comprising at least one aliphatic cyclic secondary diamine having the general formula

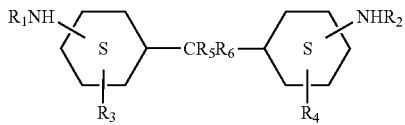

wherein $R_1$ and $R_2$ are independently linear or branched alkyl groups, having 1 to 10 carbon atoms and $R_3$, $R_4$, $R_5$ and $R_6$ are independently hydrogen or alkyl groups having 1 to 5 carbon atoms; and the total composition comprises about 15% to about 30% by volume inorganic particulate filler such that the composition can be applied at a caliper of at least 5 mm in a single pass.

* * * * *

UNITED STATES PATENT AND TRADEMARK OFFICE
CERTIFICATE OF CORRECTION

| | |
|---|---|
| PATENT NO. | : 9,657,193 B2 |
| APPLICATION NO. | : 14/001528 |
| DATED | : May 23, 2017 |
| INVENTOR(S) | : Ryan Prince et al. |

It is certified that error appears in the above-identified patent and that said Letters Patent is hereby corrected as shown below:

In the Specification

Column 1
Line 9 (Approx.), Delete "371" and insert -- §371 --, therefor.

Column 2
Line 54, After "polyamine" insert -- . --.

Column 3
Line 24, Delete "Pittsburg," and insert -- Pittsburgh, --, therefor.

Column 5-6
Line 12 (Approx.), Delete "-methylpropy1)" and insert -- -methylpropyl) --, therefor.

Column 5
Line 56, Delete "≥NR8" and insert -- —NR8 --, therefor.
Line 63, Delete "4-" and insert -- α,β- --, therefor.

Column 6
Line 50 (Approx.), Delete "a" and insert -- as --, therefor.

Column 8
Line 36 (Approx.), Delete "stoichimetric" and insert -- stoichiometric --, therefor.

Column 9-10
Line 52 (Approx.), Delete "Pittsburg," and insert -- Pittsburgh, --, therefor.
Line 56 (Approx.), Delete "Pittsburg," and insert -- Pittsburgh, --, therefor.
Line 60 (Approx.), Delete "Pittsburg," and insert -- Pittsburgh, --, therefor.
Line 63 (Approx.), Delete "Pittsburg," and insert -- Pittsburgh, --, therefor.
Line 66 (Approx.), Delete "Bilerica," and insert -- Billerica, --, therefor.

Signed and Sealed this
Sixth Day of February, 2018

Joseph Matal
*Performing the Functions and Duties of the
Under Secretary of Commerce for Intellectual Property and
Director of the United States Patent and Trademark Office*

Column 11-12
Line 10, Delete "Omycarb" and insert -- Omyacarb --, therefor.
Line 19, Delete "Pittsburg," and insert -- Pittsburgh, --, therefor.
Line 21, Delete "Heucothech" and insert -- Heucotech --, therefor.
Line 24, Delete "alklysulfonic" and insert -- alkylsulfonic --, therefor.
Line 25, Delete "Pittsburg," and insert -- Pittsburgh, --, therefor.

Column 12
Line 42, Delete "Mitutoya" and insert -- Mitutoyo --, therefor.

Column 13
Line 4, After "C./min" insert -- . --.
Line 30, Delete "Middelboro," and insert -- Middleboro, --, therefor.

Column 13-14
Line 42, Delete "Omycarb" and insert -- Omyacarb --, therefor.
Line 52, Delete "Omycarb" and insert -- Omyacarb --, therefor.

Column 15-16
Line 15 (Table), Delete "Omycarb" and insert -- Omyacarb --, therefor.